United States Patent
Price et al.

[15] 3,673,157
[45] June 27, 1972

[54] ZINC AND MANGANESE GENTISATE AS POLYESTER CATALYSTS AND MOLECULAR WEIGHT ENHANCER

[72] Inventors: John A. Price, Swarthmore; Mary J. Stewart, Media, both of Pa.

[73] Assignee: FMC Corporation, Philadelphia, Pa.

[22] Filed: July 31, 1970

[21] Appl. No.: 60,111

Related U.S. Application Data

[63] Continuation-in-part of Ser. No. 17,925, March 9, 1970, abandoned.

[52] U.S. Cl. ........................260/75 R, 260/47 C, 260/475 P, 260/429 R, 260/429.9, 260/521 R
[51] Int. Cl. ........................................................C08g 17/013

[58] Field of Search ............................260/75 C, 47 C, 475 P

[56] References Cited

UNITED STATES PATENTS

| | | | |
|---|---|---|---|
| 3,227,680 | 1/1966 | Tamblyn et al. | 260/47 |
| 3,057,826 | 10/1962 | Griffing | 260/75 |

*Primary Examiner*—Melvin Goldstein
*Attorney*—Thomas R. O'Malley, George F. Mueller and Charles A. Haase

[57] ABSTRACT

Zinc and manganese gentisate and fiber and film-forming polyester resins comprising the condensation polymerization product of (a) a saturated diester, (b) a saturated diol, and (c) a catalytic amount of zinc or manganese gentisate.

1 Claim, No Drawings

ZINC AND MANGANESE GENTISATE AS POLYESTER CATALYSTS AND MOLECULAR WEIGHT ENHANCER

This application is a continuation-in-part of our co-pending U.S. application, Ser. No. 17,925, filed Mar. 9, 1970 and now abandoned.

This invention relates to highly polymeric filament and film-forming polyester resins. More particularly, it relates to saturated polyester resins which are prepared from suitable diesters and diols and a compound which acts as a transesterification catalyst and a comonomer.

The manufacture of polyester resins from diesters and diols is well-known in the art. In the preparation of such polyesters, the diester, for example, a dialkyl terephthalate and a diol such as an alkylene glycol are first combined and subjected to an ester-interchange or transesterification reaction in the presence of an ester-interchange catalyst at elevated temperatures and atmospheric pressure. The resulting product or prepolymer is then polycondensed at higher temperatures and under reduced pressure in the presence of a polycondensation catalyst to then form the desired polyester resin.

A polyester resin of the present invention, which is copolymeric and which is suitable for filament and film-forming purposes should preferably have an intrinsic viscosity not less than about 0.60 (determined in a 60 percent phenol-40 percent tetrachloroethane solution, wt./wt., at 30° C.), a carboxyl content value of about or below 50 equivalents per million grams (eq./$10^6$ gr. or meq./kg.), and a diethylene glycol content preferably less than 1 percent by weight in order for the shaped articles formed therefrom to possess a satisfactory level of hydrolytic stability, thermal stability, and a high degree of tenacity.

From a commercial standpoint, it is essential that the polyester resin be produced in a reasonably short time and that the desired degree of polymerization be obtained. One way of evaluating the effectiveness of a transesterification or ester-interchange catalyst in the preparation of a polyester resin is by measuring the "half-time" of the catalyst. The "half-time" is defined as the time necessary for the first one half of the theoretical amount of alkanol that will be produced during the ester-interchange reaction to distill from the reaction mixture. It is desirable that the "half-time" be less than 60 minutes. However, in any case, it is essential that the transesterification catalyst act to produce a polyester prepolymer which is suitable for polycondensation to a high molecular weight polyester resin.

It is known in the prior art that the particular transesterification and polycondensation catalysts used or combinations thereof determine to a great extent the speed of a given reaction and to some extent the molecular weight of the polyester resin product which is formed. In addition, it is also known that various organic compounds having a multiplicity of functional groups can be used as polyester reactants and may also contribute to increasing the molecular weight of the resin being produced. In the case of polyesters, a cross-linking effect can be obtained by the use of compounds possessing more than two functional ester-forming groups and with certain metal compounds which tend to form complexes. Therefore, such cross-linking may be real in some cases and pseudo in others.

It is an object of this invention to provide a polyester resin by an ester-interchange process which is suitable for filament and film-forming purposes.

It is another object of the present invention to provide a highly polymeric polyester resin through the use of a transesterification catalyst which will also chemically react with the other polyester forming reactants used.

These and other objects are accomplished in accordance with the present invention by preparing polyester resins which are comprised of the condensation polymerization reaction product of (a) a diester, (b) a diol, and (c) a catalytic amount of zinc (II) or manganese (II) gentisate.

More particularly, the products of the present invention are prepared by carrying out a transesterification reaction between one or more diols and one or more diesters in the presence of zinc or manganese gentisate to form a prepolymer and then poly-condensing said prepolymer in the presence of a conventional polyester polycondensation catalyst to form a highly polymeric polyester resin.

The polyesters of the present invention are prepared from any diesters which do not contain any ethylenic unsaturation. The diesters used are lower alkyl ($C_1$ to $C_6$) diesters of aromatic dicarboxylic acids which are conventionally used to prepare fiber and film-forming polyester resins. For example, among the diesters that can be used to prepare the subject polyester resins are the lower dialkyl esters of terephthalic acid, isophthalic acid, p,p'-sulfonyl dibenzoic acid, 1,4-naphthalene dicarboxylic acid, 2,6-naphthalene dicarboxylic acid, 4,4'-diphenyl dicarboxylic acid, 3,5-dicarbobenzene sulfonic acid and its metallic salts, or any combination thereof. Additionally, in some instances if indicated, minor amounts of lower alkyl ($C_1$ to $C_6$) esters of monofunctional saturated carboxylic acids corresponding to those acids listed above can also be used as chain terminators in subject resin compositions.

Among the diols which can be used to prepare the subject polyester resins are the saturated aliphatic glycols such as the alkylene glycols and the gen-dialkyl glycols. Additionally, aromatic diols such as 1,4-cyclohexanedimethanol can also be used. The alkylene glycols used in the present invention can be represented by the formula $HO(CH_2)_nOH$, wherein n is from 2 to 10. For example, among the alkylene glycols that can be used are ethylene glycol, butylene glycol, hexamethylene glycol, and decamethylene glycol. Among the gem-dialkyl glycols that can be used are, for example, 2,2-dipropyl-1,5-pentanediol, 2,2-dimethyl-1,3-propanediol, 2,2-diethyl-1,3-propanediol, 2,2-dimethyl-1,4-butanediol, 3,3-dimethyl-1,5-pentanediol, 2-ethyl-2-methyl-1,3-propanediol, and 2,2-butyl-1,3-propanediol. In instances where the gem-dialkyl glycols are included in the present polyester compositions, they are preferably employed in concentrations ranging from about 1 to 15 percent, by weight based on the total diol content used to prepare the subject polyester resins. Obviously, however, it is within the scope of the present invention to use any combination of the foregoing diols to prepare the polyester products of the subject invention.

The resins of the present invention are prepared by an ester-interchange process to form a prepolymer and then by the polycondensation of said prepolymer. In the initial reaction mixture, a mole ratio of diol component to diester of from about 1:1 to about 15:1 can be used, but preferably from about 1.5:1 to about 2.6:1. The transesterification or ester-interchange reaction is generally carried out at atmospheric pressure in an inert atmosphere such as nitrogen, initially at a temperature within the range of from about 125° to about 250° C., but preferably from about 150° to 200° C. In accordance with the present invention, the transesterification reaction between the reactants is catalyzed by a catalytic amount of zinc or manganese gentisate. An alkanol corresponding to the dialkyl ester of the dicarboxylic acid used is continuously removed by distillation. After a reaction period of from about 1 to 2 hours, the temperature of the reaction mixture is raised from about 200° to about 300° C. for approximately 1 to 3 hours in order to complete the reaction, form the desired poly-ester prepolymer, and distill off any excess diol which is present.

The zinc or manganese gentisate which functions as a transesterification catalyst as well as a molecular weight enhancer and a comonomer is blended into the initial reaction mixture before the transesterification reaction is begun. The zinc or manganese gentisate is used in the subject reaction mixtures at a concentration of from about 0.01 to about 1.0 percent by weight, based on the weight of diester present in the said reaction mixture. In most instances, however, it has been found that from about 0.02 to about 0.5 percent by weight, based on the weight of diester present, is preferred to produce polyesters suitable for filament and film-forming purposes.

The subject metal gentisates can be prepared by first reacting gentisic acid with an alkali metal hydroxide to form the corresponding alkali metal salt of said acid and then reacting this salt with manganese (II) or zinc (II) chloride so as to displace or substitute the alkali metal ions with manganese or zinc ions and thereby form the corresponding manganese or zinc gentisate.

The following Example A will further illustrate the preparation of the zinc and manganese gentisates of the present invention.

EXAMPLE A 2.4 Grams (0.1 mole) of anhydrous lithium hydroxide (LiOH) was dissolved in 50 mls. of water. 15.4 Grams (0.1 mole) of gentisic acid was added to the above solution and the combined mixture was mixed well and then diluted to 100 mls. with water. To 50 mls. of this solution was added 8 mls. of an aqueous solution containing 3.4 grams (0.025 mole) of zinc chloride $ZnCl_2$). A white precipitate formed which was filtered off and washed with water. The resulting precipitate was then dried several hours at about 65° C. The product obtained was identified as the zinc salt of gentisic acid.

The manganese (II) salt of gentisic acid is prepared with the process steps of Example A above by using manganese (II) chloride in place of the zinc chloride.

In lower concentrations, the metal gentisates used in the present invention act principally as transesterification catalysts. In higher concentrations, the subject gentisates act not only as transesterification catalysts, but also apparently chemically react onto the chain ends and at the same time, because of possessing a functionality greater than two, tend to bring about a cross-linking of the polymer chains which results in a build-up of molecular weight.

The polycondensation of the prepolymer prepared by the above process is accomplished by adding a suitable polycondensation catalyst to the said prepolymer and heating the blend thereof under reduced pressure within the range of about 0.05 to 20 mm. of mercury while under agitation at a temperature of from about 260° to 325° C. for from 2 to 6 hours. Any known suitable polycondensation catalyst can be used, for example, antimony oxalate or lead fluoride. The polycondensation catalysts are generally employed in amounts ranging from about 0.005 to 0.5 percent, based on the total weight of the prepolymer.

Several preferred embodiments of the polyesters of the present invention are further illustrated by the following Examples.

EXAMPLE I

300 Grams of dimethyl terephthalate, 198 mls. of ethylene glycol, and 0.12 grams of zinc (II) gentisate were charged into a reaction vessel equipped with a nitrogen inlet, distilling arm, heating means and stirring means. The reaction mixture was agitated and heated at atmospheric pressure to about 198° C. under a nitrogen blanket. The reaction mixture was held at about 198° C. for about 2 hours during which time by-product methyl alcohol was distilled off. Then, the temperature was allowed to rise to 230° C. over a period of about 1 hour to distill off any remaining by-product methanol and any excess ethylene glycol and thereby form a polyester prepolymer. The resulting prepolymer was then allowed to cool under an atmosphere of nitrogen. The "half-time" of the transesterification catalyst was 35 minutes.

Fifty grams of the above-prepared prepolymer, 0.22 mls. of a 5 percent triphenylphosphite in ethylene glycol solution, and 0.02 grams of antimony trioxide was placed in a reaction vessel. This reaction mixture was heated at about 280° C. under reduced pressure of about 0.1 mm. of mercury while under agitation for about 90 minutes to bring about the polycondensation of the prepolymer product to form a polyester resin. The polyester resin formed had an intrinsic viscosity of 0.70, a carboxyl content value of 9 (meq./kg.), and a diethylene glycol content of 0.45 percent (wt.).

EXAMPLE II

A polyester resin is prepared with the same reactants, concentration of reactants, and process as used in Example I with the exception that manganese (II) gentisate is used as the transesterification catalyst instead of zinc gentisate. The resulting polyester resin has an intrinsic viscosity greater than 0.60, a diethylene glycol content less than 1 weight percent, and a carboxyl content value of below 50 (meq./kg.).

The intrinsic viscosity of the polyester resin products of the above Examples were measured in a 60 percent phenol-40 percent tetrachloroethane solution, wt./wt., at 30° C. The other analytical values were obtained by conventional laboratory procedures.

Through the use of the above described process, the transesterification reaction between suitable diols and diesters is accelerated as indicated by the "half-time" of the transesterification catalysts and a prepolymer is formed which is suitable for polycondensation into a highly polymer polyester resin.

The polyester resin products formed from the said prepolymers of the present invention have high molecular weights and are considered to be made up of chains, some of which are terminated with gentisate groups. These terminal gentisate groups, in turn, result in some chain cross-linking, which increases the intrinsic viscosity of the resulting polymer.

While the present invention has been described in detail in relation to certain embodiments, it will be obvious to those skilled in the present art that zinc or manganese gentisate can be used to catalyze the transesterification reaction between any known suitable diester and diol or combination thereof, and in turn, the polymers of such reactants will contain some chains possessing gentisate end groups.

We claim:

1. A process of preparing a highly polymeric polyester resin comprising carrying out a transesterification reaction between a lower alkyl diester of a saturated aromatic dicarboxylic acid and a (diol) saturated aliphatic glycol having two to 10 carbon atoms in the presence of a minor catalytic amount of zinc or manganese gentisate to form a polyester prepolymer and then polycondensing said prepolymer in the presence of a conventional polycondensation catalyst.

* * * * *